United States Patent
Niemela et al.

(10) Patent No.: US 11,419,427 B2
(45) Date of Patent: Aug. 23, 2022

(54) CONVERTIBLE FURNITURE SYSTEM

(71) Applicant: NB4 Brand L.L.C., Chassell, MI (US)

(72) Inventors: Cal G. Niemela, Chassell, MI (US);
Terry L. Lahti, Houghton, MI (US);
Marcus Niemela, Scottsdale, AZ (US)

(73) Assignee: The Kingstar Company, Chassell, MI (US)

( * ) Notice: Subject to any disclaimer, the term of this patent is extended or adjusted under 35 U.S.C. 154(b) by 0 days.

(21) Appl. No.: 17/114,776

(22) Filed: Dec. 8, 2020

(65) Prior Publication Data

US 2021/0169229 A1  Jun. 10, 2021

Related U.S. Application Data

(60) Provisional application No. 62/946,123, filed on Dec. 10, 2019.

(51) Int. Cl.
*A47C 17/16* (2006.01)
*A47C 17/48* (2006.01)
(Continued)

(52) U.S. Cl.
CPC .............. *A47C 17/16* (2013.01); *A47C 13/00* (2013.01); *A47C 17/04* (2013.01); *A47C 17/48* (2013.01);
(Continued)

(58) Field of Classification Search
CPC ....... A47C 17/00; A47C 13/00; A47C 13/005; A47C 17/04; A47C 17/1753; A47C 17/22; A47C 17/23; A47C 17/48; A47C 19/205; A47C 19/20; F16B 12/56; F16B 12/28; F16B 12/32; F16B 12/34; B60N 2/32; B60N 2/34; B60N 2/919; B60N 3/008; B61D 31/00
See application file for complete search history.

(56) References Cited

U.S. PATENT DOCUMENTS 2,854,672 A * 10/1958 Hagstrom .............. A47C 17/50
5/9.1
3,600,033 A * 8/1971 Holdampf ................ A47C 7/56
297/16.1
(Continued)

*Primary Examiner* — Peter M. Cuomo
*Assistant Examiner* — Madison Emanski
(74) *Attorney, Agent, or Firm* — Gardner, Linn, Burkhart & Ondersma LLP

(57) ABSTRACT

A convertible furniture system or futon includes a convertible frame assembly that is mountable in an interior space and is deployable between a bench configuration and a flat, bed configuration. The frame assembly includes a back frame and a bottom frame that are pivotably coupled together and coordinate to form either the bench configuration that provides a user an upright seat or the bed configuration that provides the user a flat, substantially horizontal bed to lie down on. A user can maneuver the system from the bench configuration into the bed configuration and vice versa. The system may be installed inside of various interior living quarters, including inside of mobile vehicles. The system includes various support elements mounted to the interior space, the support element may be selectively engaged to support the system in the bed or bench configurations and during deployment and stowage of the system.

20 Claims, 10 Drawing Sheets

(51) Int. Cl.
*A47C 13/00* (2006.01)
*A47C 17/04* (2006.01)
*F16B 12/34* (2006.01)
*F16B 12/56* (2006.01)
*A47C 17/22* (2006.01)
*A47C 17/23* (2006.01)
*F16B 12/28* (2006.01)

(52) U.S. Cl.
CPC .............. *F16B 12/28* (2013.01); *F16B 12/34* (2013.01); *A47C 13/005* (2013.01); *A47C 17/22* (2013.01); *A47C 17/23* (2013.01); *F16B 12/56* (2013.01)

(56) References Cited

U.S. PATENT DOCUMENTS 4,005,898 A * 2/1977 Way ........................ B60P 3/34
296/174
5,394,573 A * 3/1995 Laughlin ................ A47C 17/16
5/18.1

* cited by examiner

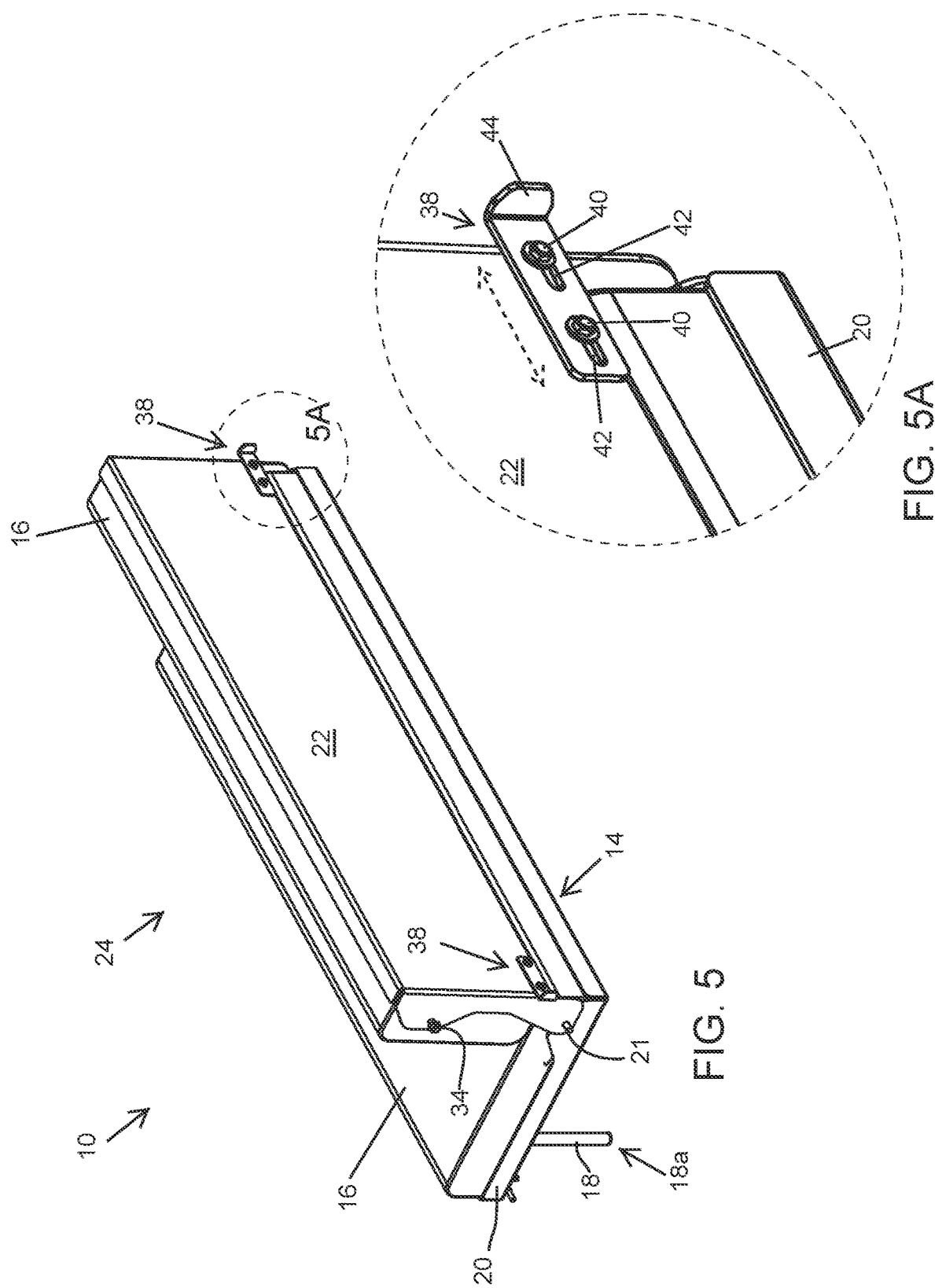

CONVERTIBLE FURNITURE SYSTEM

CROSS-REFERENCE TO RELATED APPLICATION

The present application claims priority of U.S. provisional application Ser. No. 62/946,123, filed Dec. 10, 2019, which is hereby incorporated herein by reference in its entirety.

FIELD OF THE INVENTION

The present invention relates to furniture such as benches, couches, and beds for campers, boats, and other recreational vehicles, or interior building spaces.

BACKGROUND OF THE INVENTION

Vehicle mounted living quarters, such as campers and truck bed mounted campers, have limited space available for furniture and other amenities. Users of such living quarters have to choose what types of furniture that will be placed or installed in the limited space that is available. Sofas and benches require extended space to accommodate enough seating for two or more individuals and beds require even more space than sofas to provide a space for a user or multiple users a place to lie down. Security, stability, sturdiness, and ease of use of furniture in campers are attributes that are often sacrificed in campers due to space and weight limitations.

SUMMARY OF THE INVENTION

The present invention provides a convertible furniture system for installation or mounting in a vehicle or portion of a vehicle, such as a truck, a truck bed, a camper, a truck bed mounted camper unit, a boat, a recreational vehicle, a mobile home, or other interior living spaces where multi-functional furniture is desired. The convertible furniture system is selectively extendable and retractable between a bench configuration and a flat/bed configuration. The furniture system provides a user the option to use the system as a seating space, such as a sofa, couch, or bench to sit in an upright position, or to use the system in a flat, substantially horizontal position, such as for a bed. The system may include various support brackets mounted to upright walls of the living space to support the system inside of the vehicle and to allow the system to be selectively maneuvered between the bench and bed configurations. The system may also include extendable support legs to support a portion of the system against a floor surface subjacent to the system.

In one form of the present invention, a convertible furniture system or futon is provided that is selectively operable to extend and retract between a bench configuration and a flat, bed configuration. The furniture system includes a convertible frame assembly having a back frame that supports a back cushion and a bottom frame that supports a bottom cushion. The back frame and bottom frame are pivotably coupled together at a hinge. The back frame and the bottom frame coordinate to define a bench when the convertible furniture system is in the bench configuration. The system is in the bench configuration when the back frame is generally upright and the bottom frame is generally horizontal relative to upright walls of a living space. The back frame and the bottom frame coordinate to define a bed when the convertible furniture system is in the bed configuration. The system is in the bed configuration when the back frame and the bottom frame are substantially horizontal relative to the upright walls and are adjacent and parallel to each other. The system includes a selectively operable engagement element that is coupled to a portion of the frame assembly and also includes a selectively engageable frame assembly support system that is configured to receive the selectively operable engagement element. The engagement element and support system cooperate to support the frame assembly in either the bench configuration or the bed configuration.

In one aspect, the convertible furniture system is installed in a portion of a vehicle, such as a camper unit. A pair of slotted bench back brackets are provided at a pair of opposing upright walls of the camper unit to slideably and pivotably couple and support the back frame in the camper unit. Each of the slotted bench back brackets may include a horizontal slot that is cutout from the bracket defining a slide slot that vertically supports a guide pin that is coupled to the back frame. The guide pin is operable to freely rotate and slide horizontally inside of the slide slot during deployment and stowage of the convertible furniture system, to thereby allow the back frame to pivot about the guide pin and to slide relative to the slide slot. The slotted bench back bracket further includes a pin stop or index defined by a notch formed in the bracket at a rear end of the slide slot. The pin stop retains the guide pin within the pin stop when the furniture system is in the bench configuration to retain the back frame in the generally upright orientation.

In another aspect, the selectively engageable frame assembly support system includes a pair of bed center support brackets to support a center portion of the convertible frame assembly when the system is in the bed configuration and a pair of bed end support brackets that support a front portion of the bottom frame when the furniture system is in the bed configuration. One of the pair of bed center brackets and one of the pair of bed end brackets are mounted on each of the pair of opposing sidewalls of the camper unit to support each side of the furniture system at the opposing sidewalls of the camper.

In another aspect, the selectively operable engagement element includes a slideable hook disposed on each side of a back portion of the back frame. Each slideable hook is selectively operable to engage the bed center support bracket on the corresponding sidewall when the furniture system is in the bed configuration. The slideable hook is operable to slide from a passive position where the hook is not able to interfere with deployment and stowage of the furniture system, such as by hitting the bed center support bracket, and a hooking position where the hook is able to engage the bed center support bracket to vertically support the frame assembly when the furniture system is in the bed configuration.

In yet another aspect, the selectively operable engagement element includes a latch assembly disposed on each side of a forward-bottom portion of the bottom frame. The latch assembly is selectively operable to engage the bed end support bracket on the corresponding sidewall when the furniture system is in the bed configuration. The latch assembly includes a slideable latch pin that is selectively operable to slide from a passive position where the latch pin is not able to interfere with deployment and stowage of the furniture system and a latching position where the latch pin is able to engage the bed end support bracket to vertically support the forward portion of the bottom frame when the furniture system is in the bed configuration.

In still another aspect, the selectively engageable frame assembly support system includes a pair of bottom frame end support brackets that are each disposed on opposite sidewalls of the camper and positioned to receive a latch pin of a corresponding latch assembly to vertically support the forward portion of the bottom frame when the furniture system is in the bench configuration. The bottom frame end support brackets and the bed end support brackets are each configured to receive the same latch pin, such that the latch pin can vertically support the bottom frame at a support location on the side walls in either of the bench configuration and the bed configuration.

In one aspect, the bottom frame and the back frame each have a respective cushion-supporting elongate rectangular pan with long sides extending between the sidewalls of the camper unit and short sides that are adjacent to the sidewalls of the camper unit. Structural stiffener rails may be provided along the edges along the long side and the shorts side of the frame pans. The bottom frame may be wider than the back frame, such that the seating surface is larger than the back rest surface when the furniture system is in the bench configuration. A pair of pivot pins are located at the hinge between the bottom frame and back frame, with each pin at an opposite side of the convertible frame assembly. The pivot pins are disposed through a rear portion of the short side of the rectangular bottom frame and through the bottom portion of the short side of the rectangular back frame.

In yet another aspect, the convertible furniture system includes a pair of extendable support legs coupled to a bottom portion of the bottom frame to support the bottom frame against a floor surface in both the bench and bed configurations. The extendable support legs are telescopically extendable between a shorter bench length configured to support the bottom frame against the floor surface when the furniture system is in the bench configuration, and a longer bed length configured to support the bottom frame against the floor surface when the furniture system is in the bed configuration. Optionally, a shorter first pair of extendable support legs and a longer second pair of extendable support legs are disposed on a bottom portion of the bottom frame to support the bottom frame against the floor surface when the convertible furniture system is in either the bench configuration or the bed configuration. The first (shorter) pair of extendable support legs are pivotably extendable between a bench leg extended configuration where the first pair of legs are substantially perpendicular to the bottom frame to support the bottom frame when the furniture system is in the bench configuration, and a bench leg stowed configuration adjacent to the bottom frame when the furniture system is in the bed configuration. The second (longer) pair of extendable support legs are pivotably extendable between a bed leg extended configuration where the second pair of legs are substantially perpendicular to the bottom frame to support the bottom frame when the furniture system is in the bed configuration, and a bed leg stowed configuration adjacent to the bottom frame when the furniture system is in the bench configuration.

Therefore, the convertible furniture system of the present invention may be selectively configured as a bench to provide upright seating or as a bed to provide a larger substantially horizontal surface, relative to the walls of a living space, on which a user may lie down on. The furniture system is deployable from the bench configuration to the bed configuration, and vice-versa. The furniture system includes various support brackets that are coupled to portions of a vehicle or other interior space to provide vertical support to various portions of the furniture system in both the bench configuration and the bed configuration. The convertible furniture system is supports cushions to provide comfortable seating and bedding for a user. Various slides, hooks and/or latches are provided to secure the furniture system inside of the vehicle or interior space, such as in the bench or bed configurations and also during deployment and stowage of the system.

These and other objects, advantages, purposes, and features of the present invention will become more apparent upon review of the following specification in conjunction with the drawings.

BRIEF DESCRIPTION OF THE DRAWINGS

FIG. 5 is a rear-side perspective view of the convertible furniture system of FIG. 1;

FIG. 5A is an enlarged perspective view of the region designated 5A in FIG. 5;

DETAILED DESCRIPTION OF THE PREFERRED EMBODIMENTS

Figure 1:
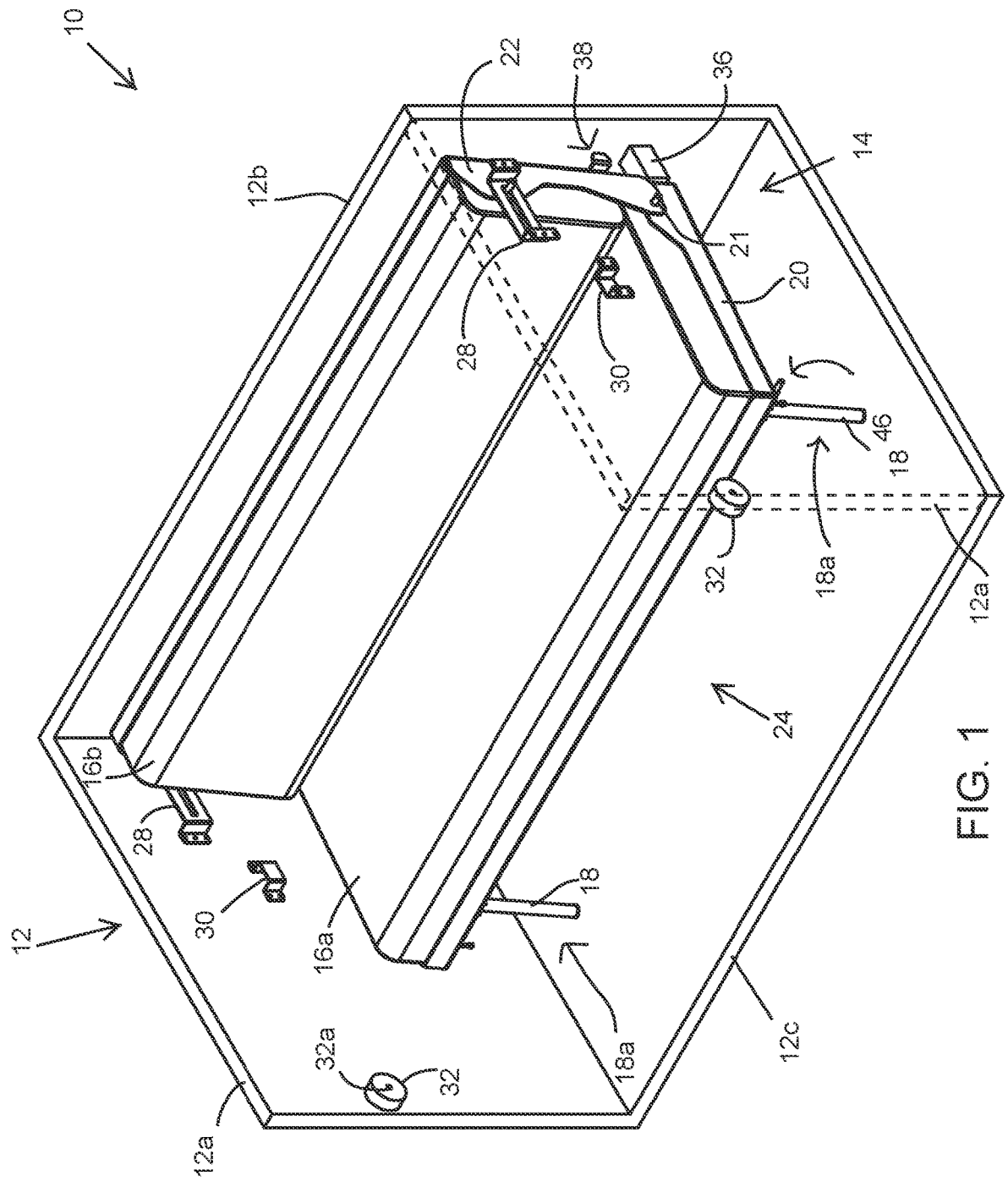
FIG. 1 is a front-side perspective view of a convertible furniture system in accordance with the present invention, depicted in a bench configuration.
Figure 2:
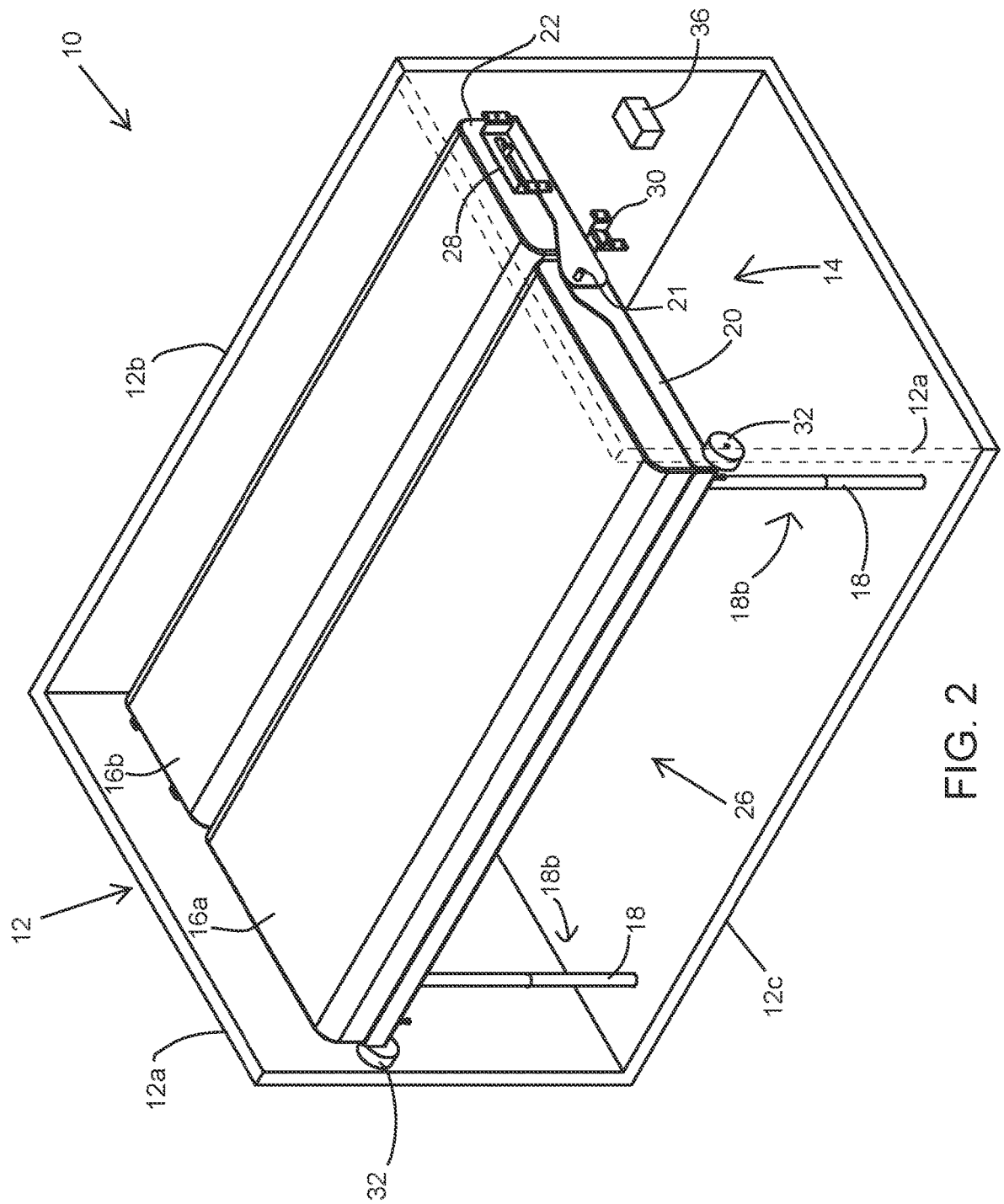
FIG. 2 is another front-side perspective view of the convertible furniture system of FIG. 1, depicted in a flat, bed configuration.

Referring now to the drawings and the illustrative embodiments depicted therein, a convertible furniture system 10 provides a seat or bench in a bench configuration 24 (FIG. 1) and a bed or lying surface in a flat or horizontal bed configuration 26 (FIG. 2). The convertible furniture system 10 may be adapted for use with various living spaces, vehicles, vehicle living quarters including campers, truck beds, or truck bed mounted camper units, or other interior spaces where multi-functional furniture is desired. As depicted in FIGS. 3A-3G, the convertible furniture system 10 is deployable between from the bench configuration 24 (FIG. 3A) to the bed configuration 26 (FIG. 3G). FIGS. 3A-3G depict the convertible furniture system 10 in sequential stages of deployment from the bench configuration 24 to the bed configuration 26, with phantom arrows indicating the direction of pull or push required to maneuver the system 10 from one stage to the next. Conversely, the steps for deployment to the bed configuration are reversed to stow the system 10 from the bed configuration 26 to the bench configuration 24. The furniture system 10 provides a sturdy seating surface or lying surface in its different configurations, and utilizes mounting hardware that releasably couples it to different surfaces in the space where it is mounted, as will be described below in more detail.

Figure 6:
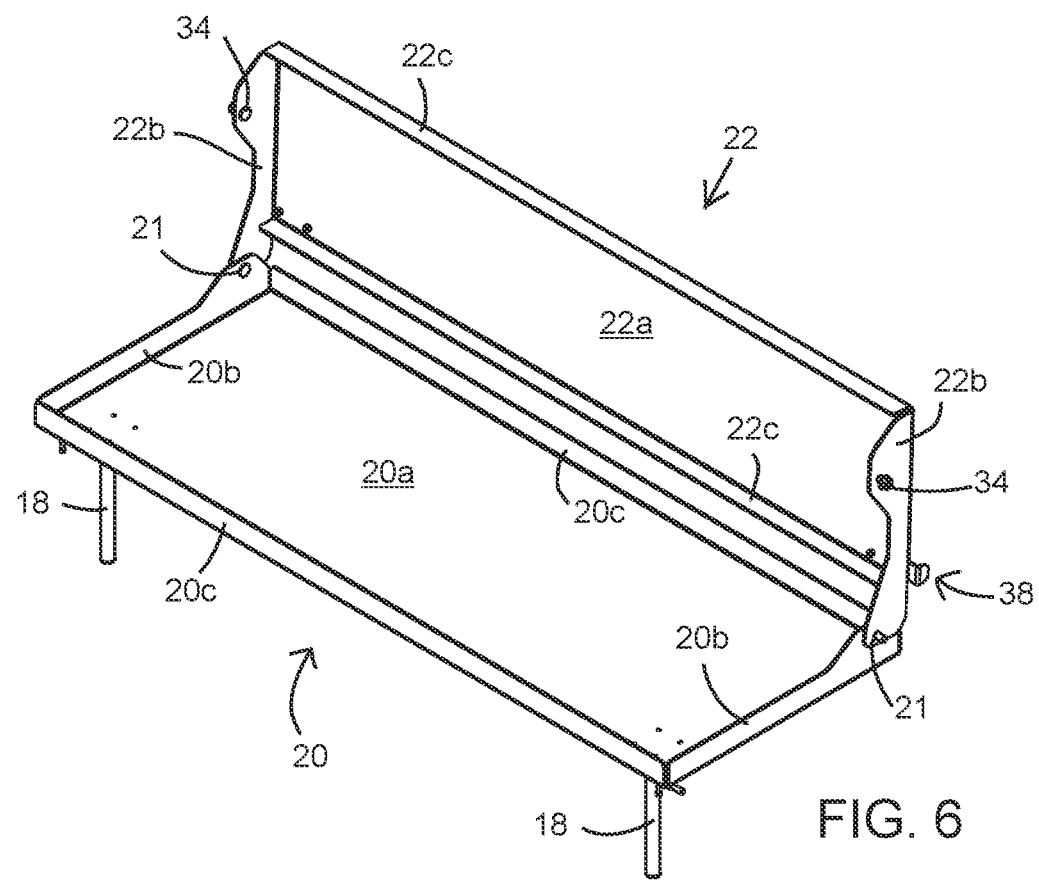
FIG. 6 is a front-side perspective view of a frame assembly of the convertible furniture system of FIG. 1.
Figure 7:
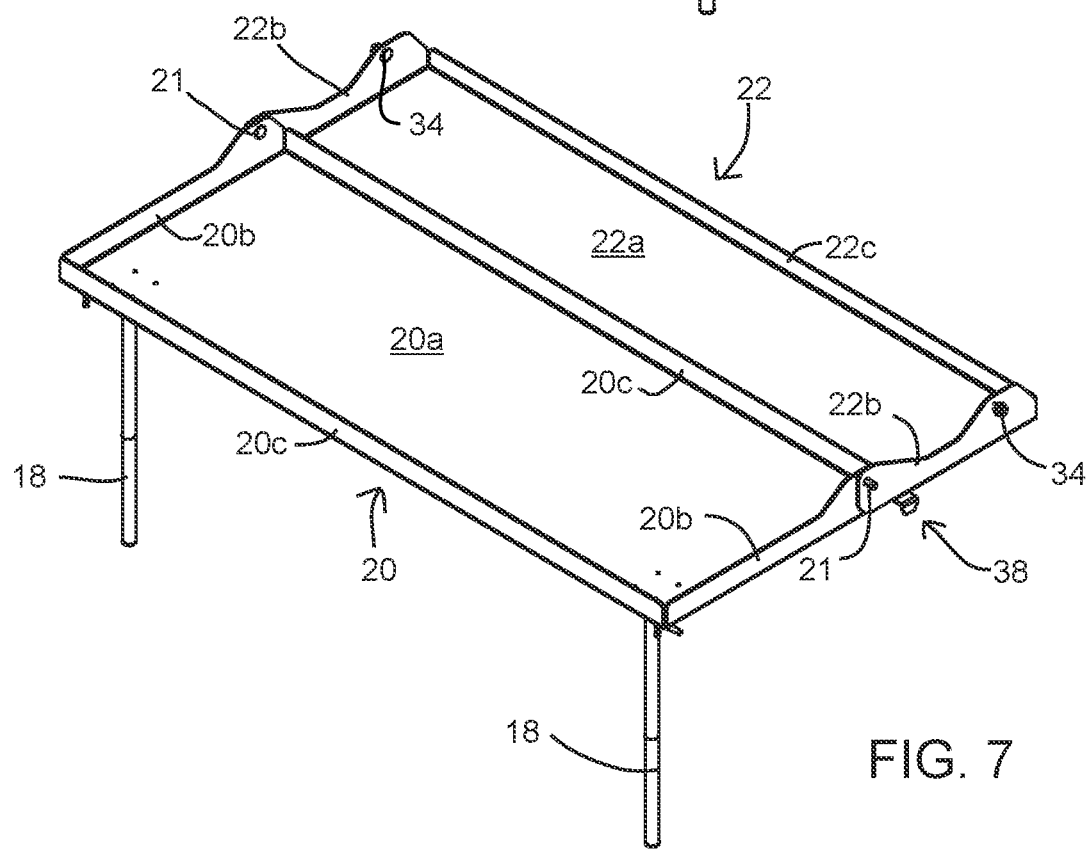
FIG. 7 is a front-side perspective view of the frame assembly of FIG. 6 depicted in the flat, bed configuration.

Referring to the illustrative embodiments of FIGS. 1-8A, a convertible furniture system or futon 10 is disposed or installed in a living space 12, depicted as a pair of opposing upright side walls 12a, a rear upright wall 12b, and a floor 12c (FIGS. 1-4). The living space 12 may be illustrative of a slide-out portion of a camper unit, for example. The furniture system 10 is selectively deployable between the seat or bench configuration 24 (FIGS. 1, 3A, 4-5, and 6) and a flat or substantially horizontal bed configuration 26 (FIGS. 2, 3G, and 7). The furniture system 10 includes a convertible frame assembly 14 and a plurality of cushions 16A, 16B supported by the frame assembly 14. Extendable legs 18 are provided to support the frame assembly 14 in each of the bench and bed configurations. The frame assembly 14 includes a bottom portion or bench bottom pan or frame 20 pivotably coupled to a back portion or bench back pan or frame 22. The bottom frame 20 and the back frame 22 coordinate to define a bench or couch in the bench configuration 24 wherein the back frame 22 is in a upright position relative to the upright walls 12a, 12b such that a user can lean their back into the back frame 22 and the back frame 22 supports the users back when the user is in a seated position and wherein the bottom frame 20 is generally horizontal such that the bottom frame 20 is angled to form a support surface that can be used without sliding off. The bottom frame 20 and the back frame 22 coordinate to define a bed in the bed configuration 26 wherein the bottom frame 20 and back frame 22 are flat and generally parallel to each other and generally horizontal such that the bed 26 is angled to form a support surface that can be used without sliding off. The bottom and back frames 20 and 22 are elevated or raised when in the bed configuration 26, such that the bed surface height is substantially higher than the bench seat height of the bottom frame 20 when in the bench configuration 24. Accordingly, the bed configuration 26 may provide additional space below the furniture system 10, as compared to the available space below the system in the bench configuration.

As best illustrated in FIGS. 6-7, the bench bottom frame 20 includes a rectangular plate or panel 20a defining a support platform for a larger bottom cushion 16a, a side stiffener or rail 20b disposed on each short side of the panel 20a, and a long stiffener or rail 20c disposed on each long side of panel 20a. The bench back frame 22 includes a rectangular plate or panel 22a defining a support platform for a smaller back cushion 16b, a shorter side stiffener or rail 22b disposed on each short/shorter side end portion of the back frame 22, and a longer side stiffener or rail 22c disposed on each long/longer, proximal and distal edge portions of the back frame 22. The bottom frame 20 is pivotably coupled at or near its rearward or proximal portion or edge to a bottom or distal portion or edge of each side rail 22b of the back frame 22 at a hinge or pivot pin 21. In the bench configuration, the hinge 21 is substantially below the proximal portion of the back frame 22, and in the bed configuration the hinge 21 is at about the same height of the proximal portion of the back frame 22.

Figure 3A:
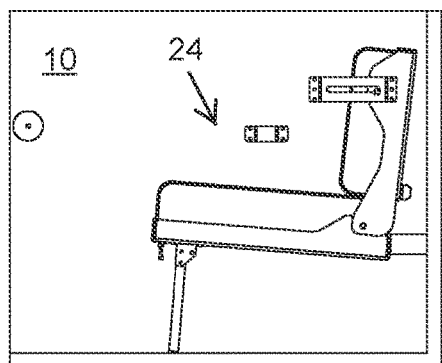
FIG. 3A-3G are side elevation views of the convertible furniture system of FIG. 1, depicting sequential steps of deploying the convertible furniture system from the bench configuration to the flat, bed configuration.
Figure 3B:
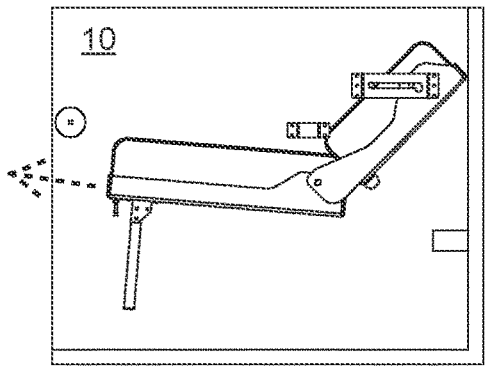
Figure 3C:
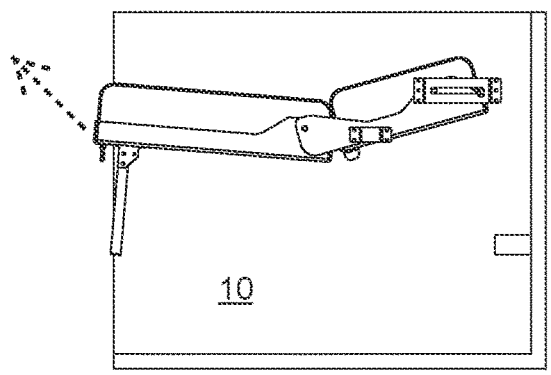
Figure 3D:
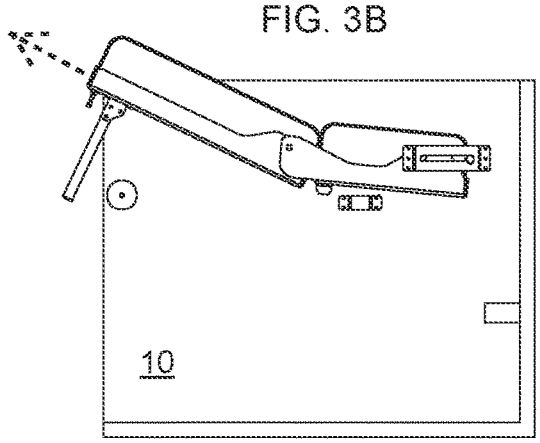
Figure 3E:
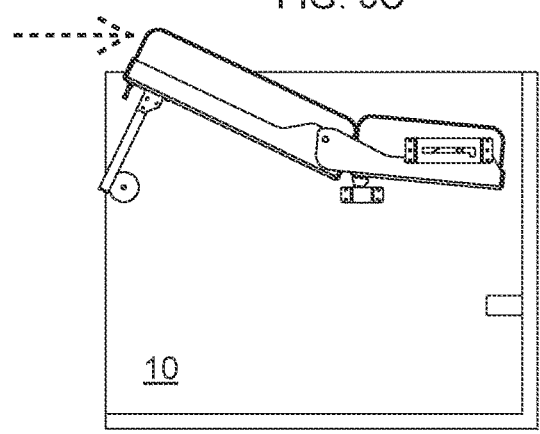
Figure 3F:
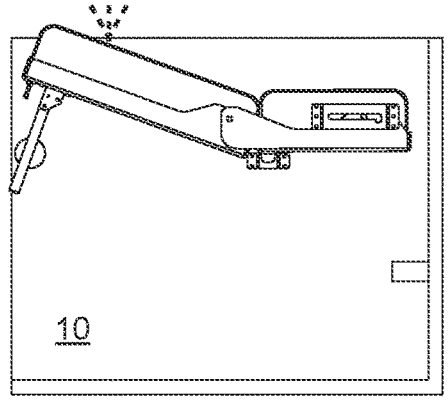
Figure 3G:
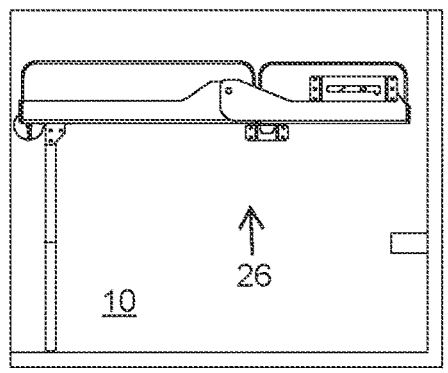

Referring to FIGS. 3A-3G, which depict a sequential deployment of the system 10, during deployment, the bottom frame 20 slides forward in the direction opposite the back frame 22 and upward away from a floor surface (FIGS. 3A-3B). As the bottom frame 20 slides forward and upward, the bottom frame 20 pulls the bottom of the back frame 22 forward causing the back frame 22 to pivot from an at least partially upright orientation to a substantially horizontal orientation (FIGS. 3B-3D). The bottom frame 20 is pulled forward and upward until it is in the substantially horizontal, bed configuration 26, wherein the bottom frame 20 and the back frame 22 are adjacent and substantially parallel to define a substantially flat horizontal surface to support cushions 16 to form a bed 26. The frame assembly 14 may pivot upward and beyond the bed configuration 26 to provide access to selectively engageable supports 30, 32 from above the supports 30, 32 prior to securing the system 10 in the bed configuration 26, as will be described in further detail below (see system orientation in FIGS. 3D-3E). These steps are reversed to stow the system 10 from the bed configuration 26 to the bench configuration 24. While the system 10 of the illustrated embodiments is configured for manual deployment by a user, it will be appreciated that a motor or assistance mechanism may be provided to assist or perform the deployment and stowage of the system 10, such as a mechanism including a linear electric motor, pneumatic linear actuator, springs, or the like, for example.

Figure 4:
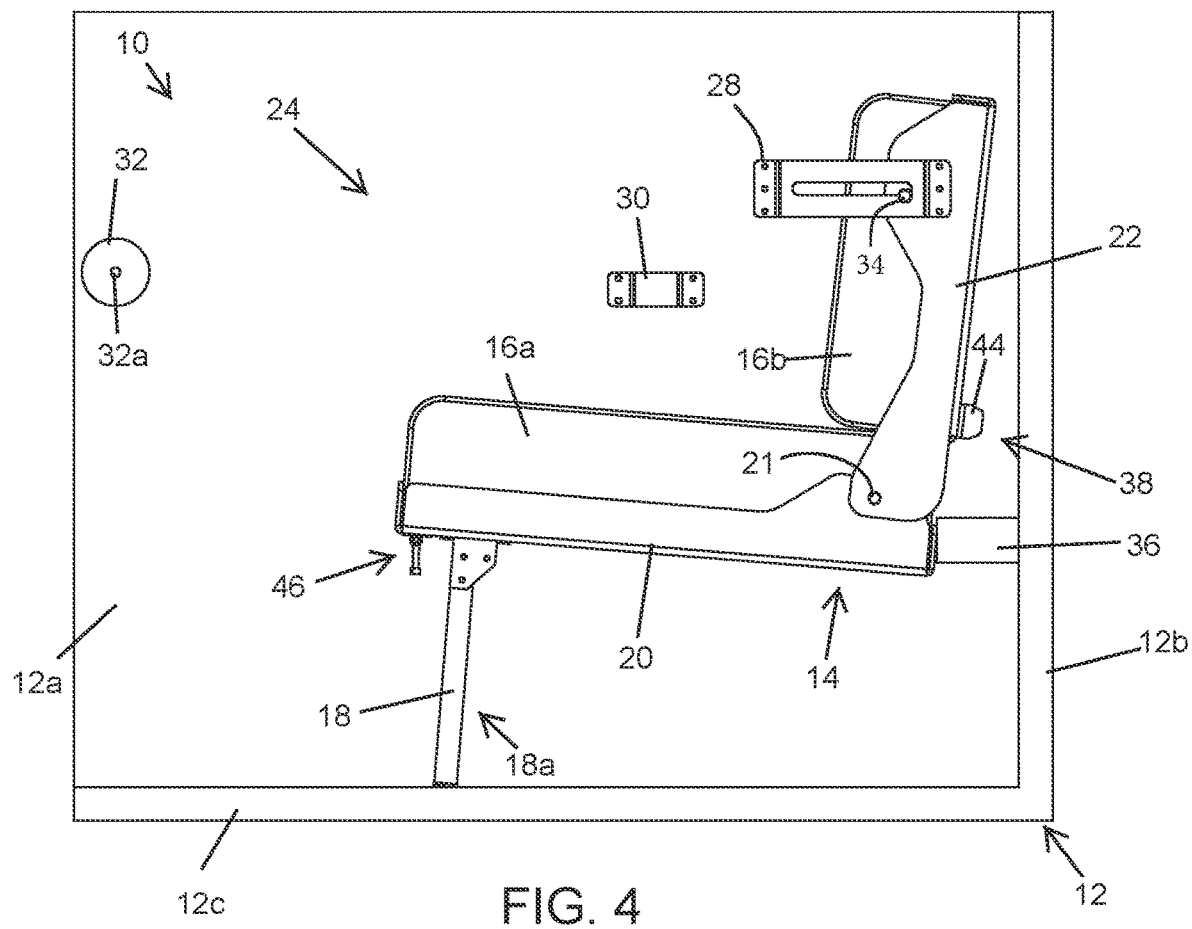
FIG. 4 is a side elevation view of the convertible furniture system of FIG. 1.

Each end of the frame assembly 14 is supported by portions of the living space 12, such as at opposing upright sidewalls 12a, at various frame assembly support elements of a frame assembly support system. The frame assembly support system includes a conversion track or guide, in the form of a pair of slotted bench back frame supports or brackets 28, and bed supports, in the form of a pair of selectively engageable bed center support brackets 30, and a pair of selectively engageable bed end support brackets 32 (FIGS. 1-4). Each slotted bench back bracket 28 is fixed to a portion of a corresponding sidewall 12a of the living space 12 and support the bench back frame 22 in a first or upright orientation or position relative to the sidewalls when the furniture system 10 is in the bench configuration 24 and support the bench back frame 22 in a second, flat, or horizontal orientation or position relative to the sidewalls when the furniture system 10 is in the bed configuration 26. Each of the slotted brackets 28 includes a slide slot 28a defined by a substantially horizontal slot that is formed or established in the bracket 28 (FIG. 4). A pair of back frame guide or support pins 34 are fixedly coupled to each side end at an upper or proximal portion of the bench back frame 22 (FIGS. 4 and 6-7). The guide pins 34 are positioned and sized to be received in the slide slots 28a and to be readily slideable along the length of the slide slots 28a of the brackets 28. The guide pins 34 and slotted brackets 28 cooperate to provide or define a back frame pivot point in which the guide pins 34, and thereby the back frame 22 and frame assembly 14, are vertically supported by the respective slotted brackets 28 at substantially all times when the pins 34 are disposed inside the slide slots 28a (in other words, when the frame assembly 14 is installed in the living space 12). In some embodiments, the hinge 21 and guide pins 34 may be at generally equal heights when the system 10 is in the bed configuration 26, such that the bed surface height is flat and parallel across the cushions 16A and 16B.

Figure 4A:
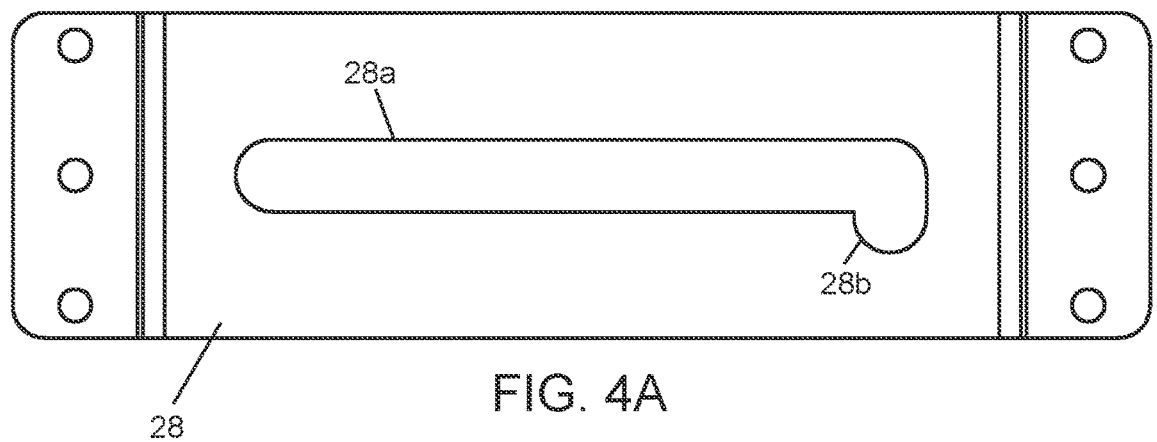
FIG. 4A is an enlarged side elevation view of slotted bracket for supporting a back frame of the furniture system in accordance with the present invention.

As shown in the illustrated embodiments of FIGS. 3A-3G, as the convertible furniture system 10 is deploying to the bed configuration 26, the guide pins 34 slide along the inside of the slide slots 28a to allow a user to maneuver the system 10 as necessary to position the system 10 into the bed configuration 26. The same applies when a user is maneuvering the convertible furniture system 10 from the bed configuration 26 to the bench configuration 24. Each slide slot 28a includes a retaining pin stop, index, or rest 28b defined by a notch cutout of the slotted bracket 28 and disposed at a rear portion of the slide slot 28a (FIG. 4A). The pin stop 28b receives the respective guide pin 34 when the guide pin is in the fully back position inside of the slide slot 28a, such that the pin stop 28b retains the guide pin 34 to prevent the guide pin 34 from freely sliding along the slide slot 28a when the furniture system is to remain static in the bench configuration 24. A pair of bench back stop blocks or rest supports 36 (FIG. 4) are disposed on a portion of a back wall 12b of the living space 12 to space the lower back portion of the furniture system 10 away from the back wall 12b to retain a desired angle for the bench back frame 22 and thereby provide a comfortable seating position for a user.

The bed center support brackets 30 are fixed to a portion of each respective sidewall 12a to support a center portion of the side of the convertible furniture system 10 when the system 10 is in the bed configuration 26 (FIGS. 1-2 and 3G). Each center bracket 30 is configured such that as the system 10 is maneuvering between the bench 24 and bed 26 configurations, the back frame 22 and the bottom frame 20 cannot contact or hit the center bracket 30. The distance that the center brackets 30 extends inwardly from the sidewall 12a allows the frame assembly 14 to freely pass the center brackets 30 to raise above and lower under the center brackets 30 as necessary during maneuvering of the system 10.

A selectively operable engagement element is provided in the form of a pair of slideably extendable support hooks 38 which are disposed at opposite ends of the furniture system 10, on a lower, back portion of the back frame 22 (FIGS. 4, 5, and 5A). Each support hook 38 is selectively slideable from a passive position wherein the hook 38 is not able to interact with the center support bracket 30 and an extended or hooking position where a hook portion or tab 44 of the hook 38 is insertable into the center support bracket 30 to vertically support a center, side portion of the system 10 in the bed configuration 26 (FIGS. 4-5A). As best illustrated in FIG. 5A, each slideable hook 38 is slideably coupled to the lower back portion of the back frame 22 with mechanical fasteners 40. The mechanical fasteners are disposed through slots 42 in the hook 38. The mechanical fasteners 40 secure the hook 38 to the back frame 22 while allowing the hook 38 to selectively slide back and forth from the passive position to the hooking position relative to the fasteners 40. The hook 38 includes the hook portion or tab 44 at the distal end of the hook 38 and the hook 44 is insertable into an upper portion of the center support bracket 30 to secure the hook 38 to the bracket 30. The hook 38 is vertically supported by the center support bracket 30 when the hook 44 is inserted into center support bracket 30, and as such, the hook 38 vertically supports the center of the side of the frame assembly 14 when the system 10 is static in the bed configuration 26.

Figure 8:
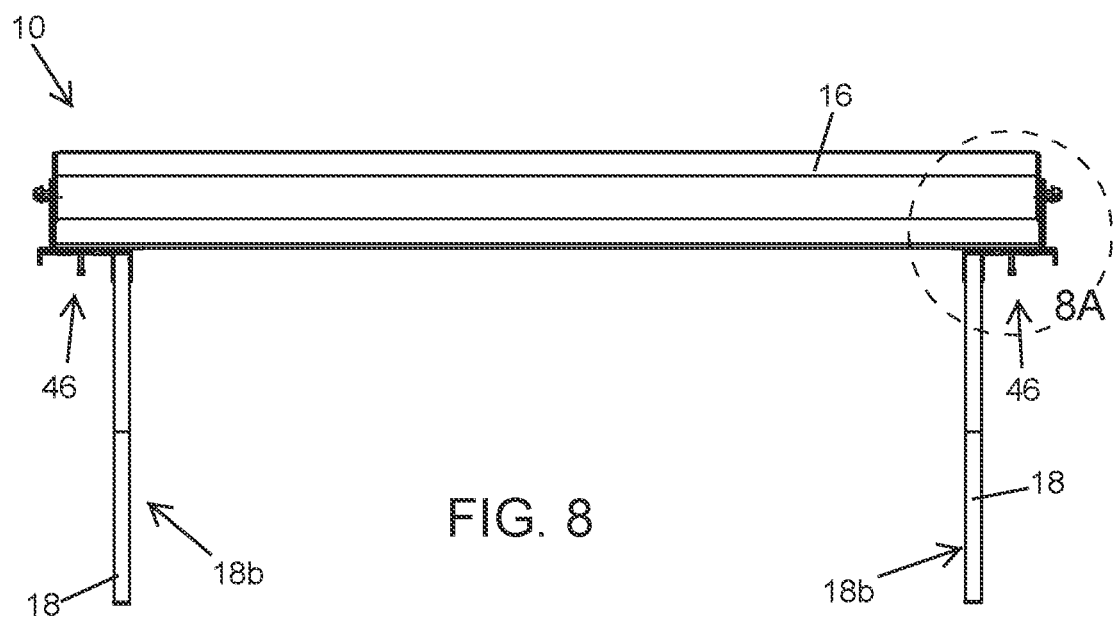
FIG. 8 is a front elevation view of the convertible furniture system of FIG. 2.
Figure 8A:
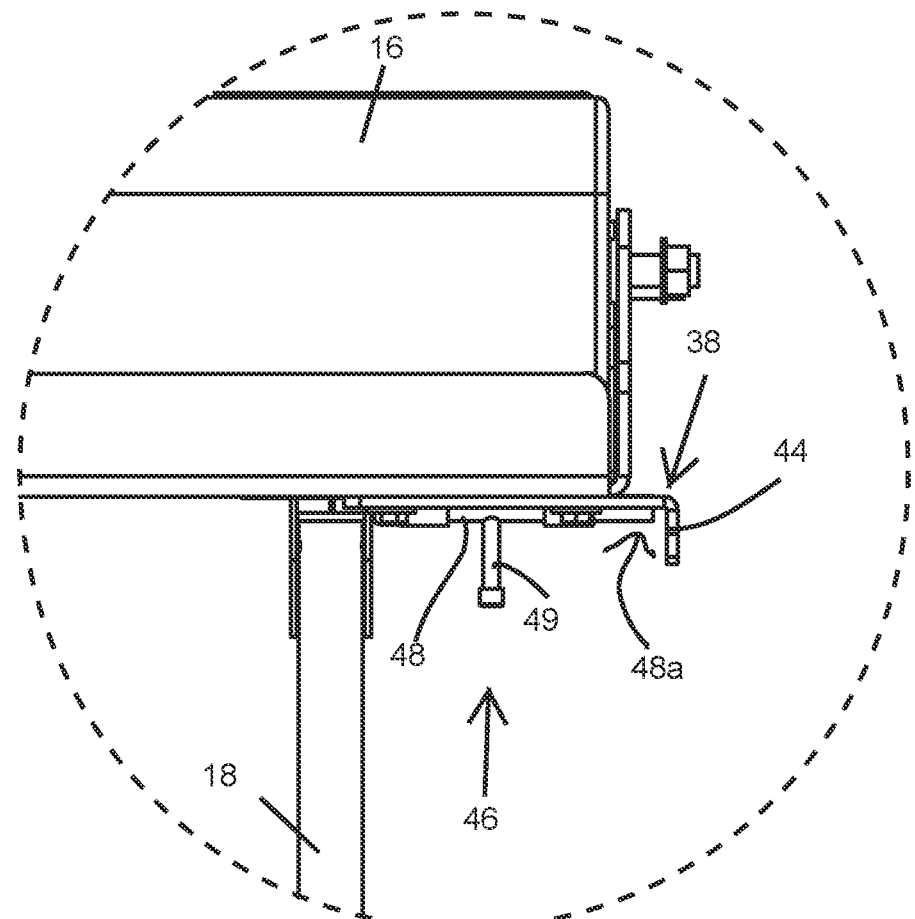
FIG. 8A is an enlarged perspective view of the region designated 8A in FIG. 8.

The bed end support brackets 32 are fixed to a portion of each respective sidewall 12a to support the end portions of the convertible furniture system 10 when the system 10 is in the bed configuration 26 (FIGS. 1-2 and 3G). Each bed end support bracket 32 includes a pin-hole 32a disposed in the bracket 32 (FIG. 4). A selectively operable engagement element, in the form of a latch pin assembly 46, is disposed at opposite ends of the furniture system 10, on a forward, bottom portion of the bottom frame 20 (FIGS. 8-8A). When the convertible furniture system 10 is in the substantially horizontal bed configuration 26, the latch pin assemblies 46 are located adjacent to the respective bed end support brackets 32. Each latch pin assembly 46 includes a slideable pin 48 with a handle 49. The slideable pin 48 is selectively slideable between a passive position wherein the pin 48 is not able to interact with the respective bed end support bracket 32 and an extended or latching position in which a distal end portion 48a of the pin 48 is insertable into the pin-hole 32a to vertically support the forward end of the furniture system 10 in the bed configuration 26 (FIG. 2). The pin-hole 32a is positioned and sized to receive the distal end 48a of the latch pin 48 in the extended position. The latch pin 48 is vertically supported by the bed end support bracket 32 when the latch pin distal end 48a is inserted into bed end support bracket 32, and as such the latch assembly 46 vertically supports the forward portion of the frame assembly 14 when the system 10 is static in the bed configuration 26.

In the illustrated embodiment of FIGS. 1-8A, the extendable support legs 18 are coupled to a leg bracket 50 that is disposed at a forward, bottom portion of the bottom frame 20. The extendable legs 18 are substantially perpendicular to the bottom frame 20. The extendable legs 18 are telescopically extendable between a bench length 18a where the legs 18 are sized to support the bottom frame 20 in the bench configuration 24 (FIGS. 1, 3A, 4, 5, and 6) and a bed length 18b where the legs 18 are sized to support the bottom frame 20 in the bed configuration 26 (FIGS. 2, 3G, and 7-8).

As best illustrated in FIGS. 3A-3G, the convertible furniture system 10 is maneuverable between the bench configuration 24 shown in FIG. 3A and the bed configuration 26 shown in FIG. 3G, with user input forces or maneuvers illustrated in phantom. From the bench configuration 24, a user can pull the bottom frame 20 forward away from the back wall 12b which causes the back frame 22 to pivot about the guide pins 34 that are disposed in the respective slotted brackets 28, with the lower portion of the back frame 22 moving away from the back wall 12b and thereby causing the bottom frame 20 to raise upward away from the floor surface (FIG. 3B). The user can then lift upward on the bottom frame 20 while continuing to pull forward, causing the bottom frame 20 to raise further and the back frame 22 to approach a horizontal orientation (FIG. 3C). The user continues to pull forward and upward on the bottom frame 20 until the bottom frame 20 and back frame 22 have both risen above and cleared the bed center support brackets 30 and bed end support brackets 32, with the back frame 22 being slightly above a horizontal orientation (FIG. 3D).

Once the bottom frame 20 and back frame 22 have cleared above the support brackets 30, 32, the user can push the bottom frame 22 backward causing the back frame 22 to return to a horizontal positon and the user can position the furniture system 10 laterally relative to the guide pins 34 and slotted brackets 28 to position and insert the slidable support hooks 38 into respective bed center support brackets 30 to support the back frame 22 in the generally horizontal orientation (FIG. 3E). The user can then push down on the bottom frame 22 or allow gravity to urge the bottom frame 22 downward toward a horizontal orientation (FIG. 3F). The user can locate the slideable pins 48 into respective bed end support brackets 32 to support the back frame 22 in the generally horizontal orientation (FIG. 3G), at which point the furniture system 10 is in the bed configuration 26. These steps can be reversed in order to deploy the furniture system 10 from the bed configuration 26 to the bench configuration 24.

Figure 10:
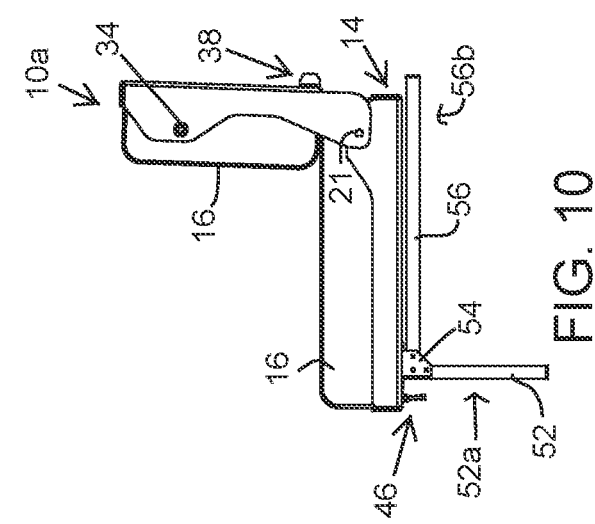
FIG. 10 is a side elevation view of the convertible furniture system of FIG. 9.
Figure 12:
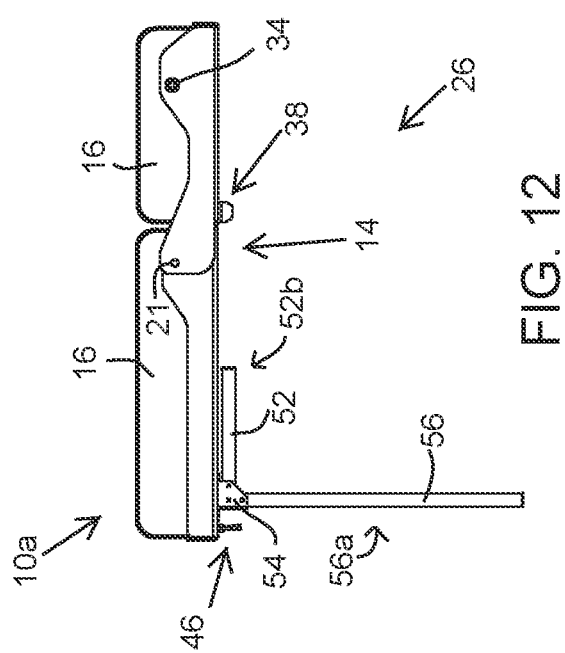
FIG. 12 is a side elevation view of the convertible furniture system of FIG. 11.
Figure 9:
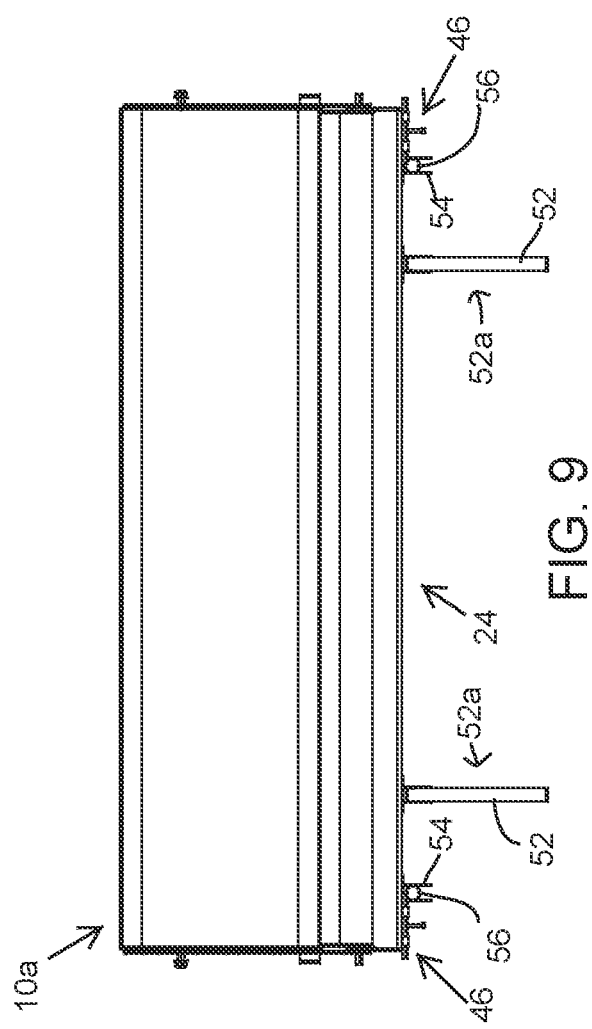
FIG. 9 is a front elevation view of another convertible furniture system in accordance with the present invention, depicted in a bench configuration.
Figure 11:
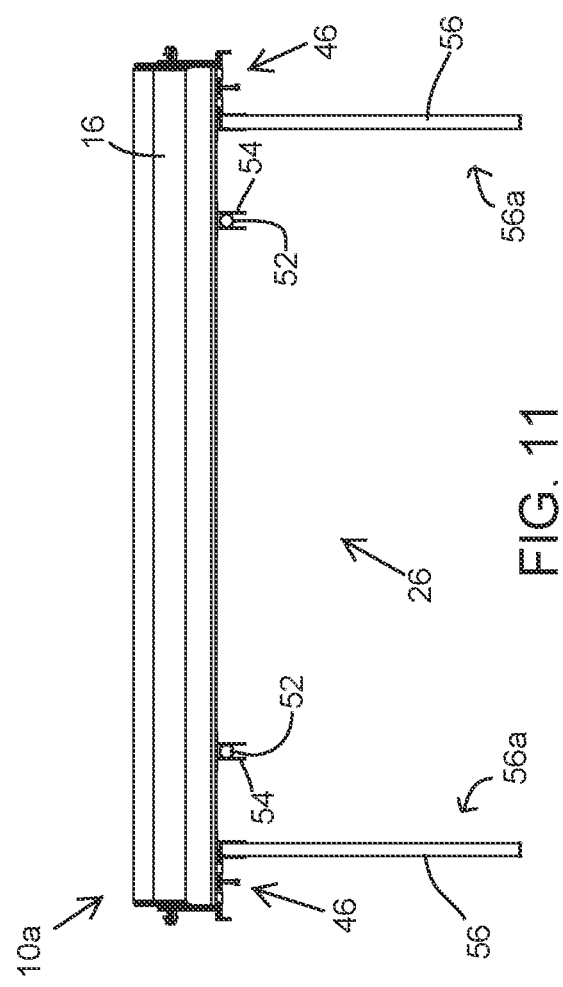
FIG. 11 is a front elevation view of the convertible furniture system of FIG. 9, depicted in a flat, bed configuration.

In the illustrated embodiment of FIGS. 9-12, a multi-leg convertible furniture system 10a is configured similarly and functions in similar fashion to convertible furniture system 10 described above, and includes many identical or substantially similar components, with significant differences discussed hereinafter. The multi-leg convertible furniture system 10a includes a pair of pivotably extendable bench support legs 52 that are each coupled to a corresponding leg bracket 54 disposed at a forward, bottom portion of the bottom frame 20, and a pair of pivotably extendable bed support legs 56 that are each coupled to a corresponding leg bracket 54 disposed at a forward, bottom portion of the bottom frame 20 and spaced apart from the extendable bench support legs 52. The bench support legs 52 are pivotably extendable between a bench leg extended configuration 52a where the legs 52 are substantially perpendicular to the bottom frame 20 and support the bottom frame 20 in the bench configuration 24 (FIGS. 9-10) and a bench leg stowed configuration 52b where the legs 52 are substantially parallel to the bottom frame 20 (FIGS. 11-12). The extendable bed support legs 56 are pivotably extendable between a bed leg extended configuration 56a where the legs 56 are substantially perpendicular to the bottom frame 20 and support the bottom frame 20 in the bed configuration 26 (FIGS. 11-12), and a bed leg stowed configuration 56b where the legs 56 are substantially parallel to the bottom frame 20 (FIGS. 9-10). The extendable bed support legs 56 may support the bottom frame 20 in the beg configuration 26 either on their own, or may cooperate with a pair of selectively engageable bed end support brackets, such as brackets 32 of system 10, which are configured to receive selectively operable engagement elements, such as the latch pin assemblies 46.

Figure 13:
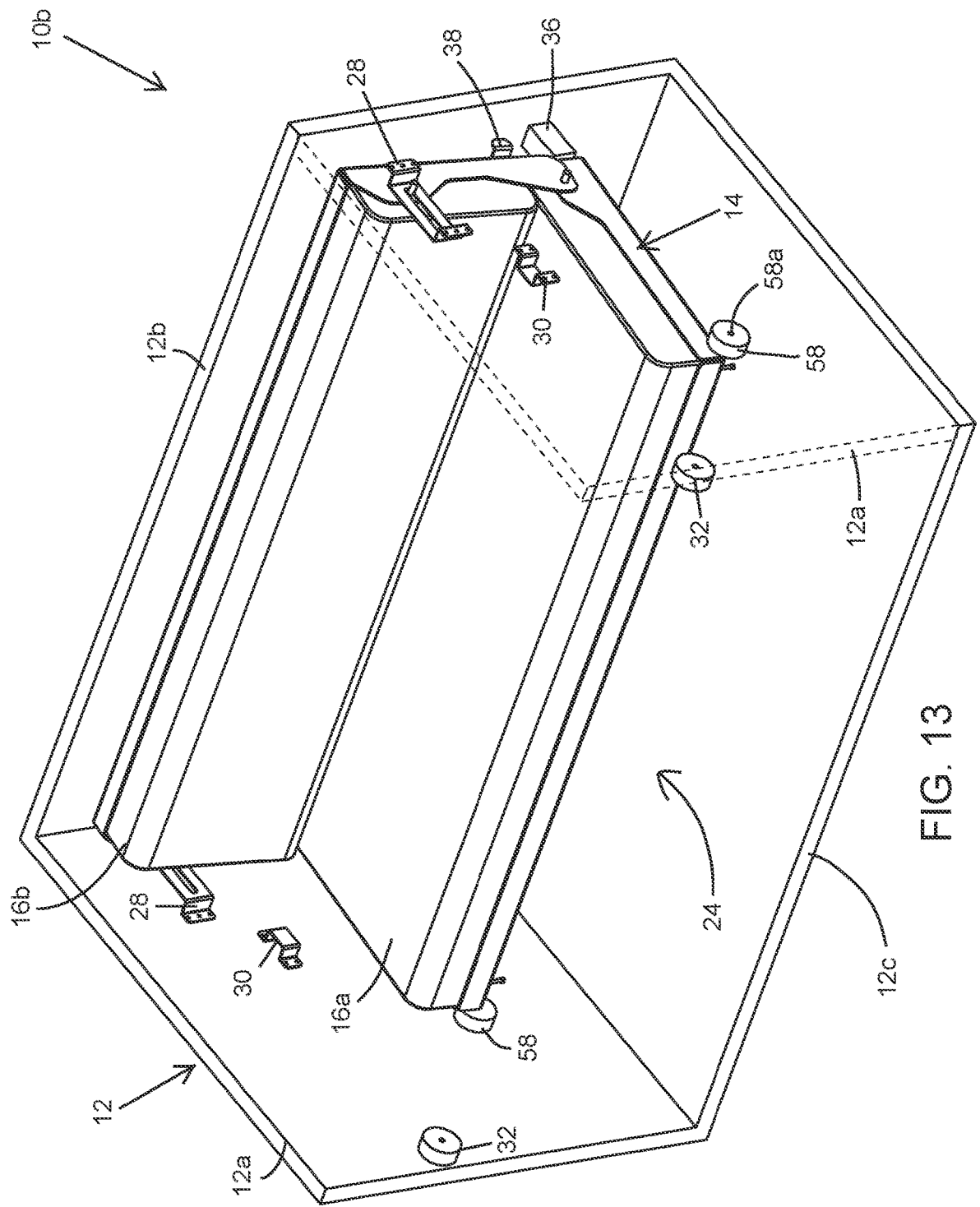
FIG. 13 is a front-side perspective view of another convertible furniture system in accordance with the present invention, depicted in a bench configuration.
Figure 14:
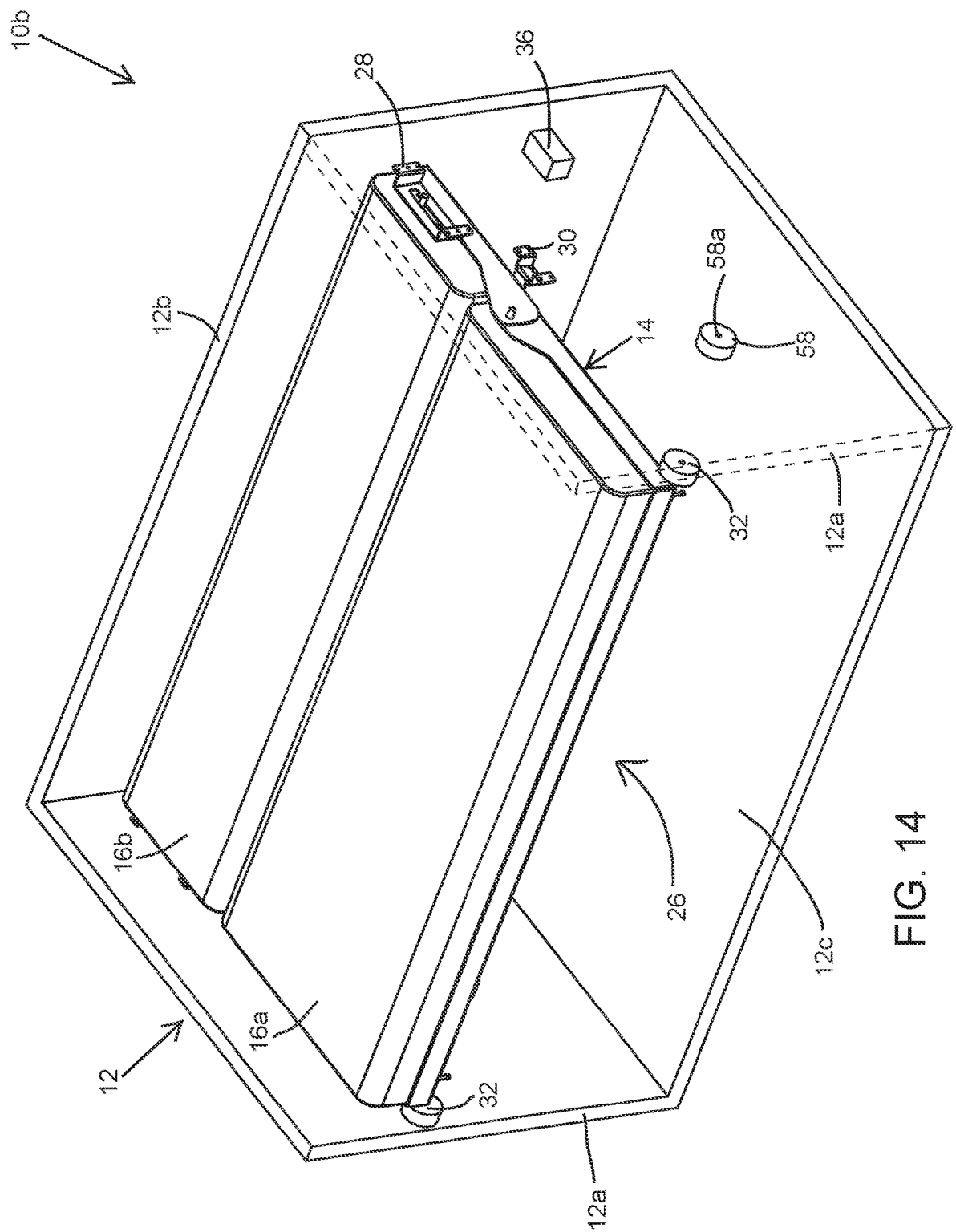
FIG. 14 is a front-side perspective view of the convertible furniture system of FIG. 13, depicted in a flat, bed configuration.

In the illustrated embodiment of FIGS. 13-14, a legless convertible furniture system 10b is configured similarly and functions in similar fashion to the convertible furniture system 10 and the multi-leg convertible furniture system 10a described above, and includes many identical or substantially similar components, with significant differences discussed hereinafter. The legless system 10b is configured to mount to the living space 12 without support from extendable legs. Legless convertible furniture system 10b includes a selectively engageable bottom frame end support bracket 58 fixed to a portion of each sidewall 12a to support a forward end portion of the convertible furniture system 10b when the system 10b is in the bench configuration 24 (FIG. 13). The bottom frame end support brackets 58 of FIGS. 13 and 14 are substantially identical to the bed end support brackets 32 described previously, and each includes a pin-hole 58a disposed in the bracket 58 (FIGS. 13-14). The pin-holes 58a are positioned and sized to receive the distal ends 48a of the respective latch pins 48 when the pins 48 are in the extended latch position. The latch pins 48 are vertically supported by the bottom frame end support brackets 58 when the latch pins' distal ends 48a are inserted into bottom frame end support brackets 58, and as such the latch assembly 46 vertically supports the forward portion of the frame assembly 14 in the bench configuration 24. While the bottom frame 20 of the legless convertible furniture system 10b is supported without legs, it will be appreciated that extendable or fixed legs may be provided in addition to the bottom frame end support brackets 58 to further support the bottom frame 20 in the bench configuration 24.

Thus, the convertible furniture system of the present invention provides a user a selectively deployable futon that is installed into or integrated with a living space or a vehicle living quarter, such as a truck bed mounted camper unit. The system is operable to maneuver between a bench configuration that provides upright seating and a flat, bed configuration that provides a flat and substantially horizontal bed. The system includes various supports that are selectively operable and selectively engageable to secure and support the system in each of the static bench and bed configurations and/or to support the system during deployment and stowage between the static configurations. Extendable support legs may be included to support portions of the convertible furniture system against a floor surface subjacent to the system.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A convertible furniture system comprising:
    a convertible frame assembly comprising a back frame pivotably coupled at a proximal portion of said back frame to at least one of a plurality of upright walls at a back frame pivot point, and a bottom frame pivotably coupled at a proximal end to a distal end of said back frame at a hinge, said frame assembly selectively operable to extend and retract between a bench configuration and a flat configuration;
    an engagement element coupled to a portion of said frame assembly; and
    a frame assembly support system coupled to at least one of the upright walls and configured to selectively receive and support a portion of said engagement element to retain said frame assembly in at least one chosen from said bench configuration and said flat configuration;
    wherein, in said bench configuration, said back frame is in a first position that is upright with the distal end of said back frame and said hinge below the proximal end of said back frame, and said bottom frame extends laterally from the distal end of said back frame; and
    wherein, in said flat configuration, said back frame is in a second position with the distal end and the proximal end of said back frame at the same height, said back and bottom frames are parallel to one another, said back and bottom frames are perpendicular to the upright walls, and said hinge is at generally the same height as said back frame pivot point.

2. The convertible furniture system of claim 1, further comprising a pair of slotted bench back brackets defining a portion of said back frame pivot point, said slotted bench back brackets pivotably and slideably support an upper portion of said back frame between opposing upright side walls, said slotted bench back brackets disposed on respective ones of the opposing upright side walls.

3. The convertible furniture system of claim 2, wherein each of said slotted bench back brackets defines a horizontal slide slot configured to vertically support a guide pin that is coupled to said back frame, wherein said guide pin defines a portion of said back frame pivot point and is operable to freely rotate and slide inside of said slide slot during extension and retraction of said convertible furniture system.

4. The convertible furniture system of claim 3, wherein said slotted bench back bracket further comprises a pin index defined by a notch formed at one end of said slide slot, said pin index configured to retain said guide pin when said furniture system is in said bench configuration.

5. The convertible furniture system of claim 1, wherein said frame assembly support system comprises a pair of center support brackets that support a center portion of a side of said frame assembly when in said flat configuration, and a pair of end support brackets that support a distal portion of said bottom frame when in said flat configuration, wherein respective ones of said center support brackets and said end support brackets are disposed on opposing upright side walls.

6. The convertible furniture system of claim 5, wherein said engagement element comprises a slideably extendable hook disposed on each side of a back portion of said back frame, each of said extendable hooks operable to engage a respective one of said center support brackets when said frame assembly is in said flat configuration, wherein said extendable hooks are slideable between a retracted position to permit extension and retraction of said frame assembly, and an extended position in which said extendable hooks are engageable with said center support brackets to vertically support said frame assembly in said flat configuration.

7. The convertible furniture system of claim 5, wherein said engagement element comprises a latch assembly disposed on each side of the front distal portion of said bottom frame, each of said latch assemblies operable to engage a respective one of said end support brackets when said frame assembly is in said flat configuration, each of said latch assemblies comprising an extendable latch pin that is slideable from a retracted position to permit extension and retraction of said frame assembly, to an extended position engaging a respective one of said end support brackets to vertically support the distal portion of said bottom frame when in said flat configuration.

8. The convertible furniture system of claim 7, wherein said frame assembly support system further comprises a pair of bottom frame end support brackets disposed on respective ones of the opposing upright side walls and configured to receive a corresponding one of said latch pins to vertically support the distal portion of said bottom frame when said frame assembly is in said bench configuration.

9. The convertible furniture system of claim 1, further comprising a pair of extendable support legs coupled to a bottom portion of said bottom frame and selectively extendable to support said bottom frame against a floor.

10. The convertible furniture system of claim 9, wherein said pair of extendable support legs are telescopically extendable between a bench length configured to support said bottom frame against the floor surface when said frame assembly is in said bench configuration, and a bed length configured to support said bottom frame against the floor surface when said frame assembly is in said flat configuration.

11. The convertible furniture system of claim 9, wherein said pair of extendable support legs are pivotably extendable between an extended bench leg position substantially perpendicular to said bottom frame to support said bottom frame when said frame assembly is in said bench configuration, and a stowed bench leg position substantially parallel to said bottom frame when said frame assembly is in said flat configuration.

12. The convertible furniture system of claim 11, further comprising another pair of extendable support legs that are pivotably extendable between an extended bed leg position substantially perpendicular to said bottom frame to support said bottom frame against the floor surface when said frame assembly is in said flat configuration, and a stowed bed leg configuration substantially parallel to said bottom frame when said frame assembly is in said bench configuration, wherein said another pair of extendable support legs are longer than said pair of extendable support legs.

13. A convertible furniture system operable to extend and retract between a bench configuration and a flat bed configuration, said system comprising:
a back frame pivotably coupled between a pair of opposing upright walls at a back frame pivot point and having an elongate rectangular pan having its long sides extending between the pair of opposing upright walls and its short sides adjacent to respective ones of the pair of opposing upright walls;
a bottom frame pivotably coupled to said back frame and having an elongate rectangular pan having its long sides extending between the pair of opposing upright walls and its short sides adjacent to respective ones of the pair of opposing upright walls;
a hinge coupling said back frame to said bottom frame, wherein said back frame and said bottom frame define a convertible frame assembly that is pivotable about said hinge, said hinge comprising a pair of pivot pins, each of said pivot pins is disposed at a respective end of said frame assembly proximate respective ones of the pair of opposing upright walls; and
a plurality of frame assembly supports fixed to the pair of opposing upright walls and configured to couple and support said furniture system inside the living space, said plurality of frame assembly supports defining a portion of said back frame pivot point at which a proximal portion of said back frame is pivotably coupled to the opposing upright walls;
wherein said frame assembly is in said bench configuration when said back frame is in a first position that is upright and said bottom frame extends laterally from a distal portion of said back frame; and
wherein said frame assembly is in said flat bed configuration when said back frame is in a second position and parallel with said bottom frame, and said hinge is at generally the same height as said back frame pivot point.

14. The convertible furniture system of claim 13, wherein said frame assembly supports comprise a pair of wall-mounted slotted bench back brackets that define a portion of said back frame pivot point and slideably support a proximal portion of said back frame, a pair of wall-mounted center support brackets, and a pair of wall-mounted end support brackets, wherein said center support brackets are configured to receive respective first engagement elements disposed at a center portion of said frame assembly to support a center portion of said frame assembly in said bed configuration, and wherein said end support brackets are configured to receive respective second engagement elements disposed at a distal portion of said bottom frame to support the distal portion of said bottom frame when said frame assembly is in said bed configuration.

15. The convertible furniture system of claim 14, wherein each of said slotted bench back brackets defines a horizontal slide slot configured to vertically support a guide pin coupled to said back frame, wherein said guide pin defines a portion of said back frame pivot point and is operable to freely rotate and slide inside of said slide slot during extension and retraction of said convertible furniture system.

16. The convertible furniture system of claim 14, wherein said frame assembly supports comprises a pair of bottom frame end support brackets disposed on respective ones of the opposing upright walls, each of said bottom frame end support brackets configured to receive one of said second engagement elements to support the distal portion of said bottom frame when said frame assembly is in said bench configuration.

17. The convertible furniture system of claim 13, further comprising a pair of extendable support legs coupled to a bottom portion of said bottom frame and selectively extendable to support said bottom frame against a floor adjacent the upright walls.

18. A convertible furniture system that is convertible between a bench and a bed, said convertible furniture system comprising:
- a frame assembly comprising:
  - a first frame portion pivotably coupled at a proximal edge between a pair of opposing upright walls;
  - a second frame portion releasably coupled between the pair of opposing upright walls; and
  - a hinge coupling said first frame portion to said second frame portion proximate a distal edge of said first frame portion and a proximal edge of said second frame portion;
  - wherein said frame assembly is repositionable between a bench configuration in which said first frame portion is upright relative to the upright walls, and a flat configuration in which said first frame portion is perpendicular to the opposing upright walls;
- a slotted bracket fixed at each of the opposing upright walls proximate the proximal edge of said first frame portion, said slotted bracket comprising a horizontal slide slot configured to slideably and pivotably couple the proximal edge of said first frame portion to the opposing upright walls such that the proximal edge of said first frame portion is vertically supported at said slotted bracket and readily horizontally slideable within said slide slot;
- a bench support configured to selectively support said second frame portion when said frame assembly is in said bench configuration;
- a bed support configured to selectively support said second frame portion when said frame assembly is in said flat configuration; and
- a frame assembly support disposed at each of the opposing upright walls and spaced apart from respective ones of said slotted brackets, each of said frame assembly supports configured to selectively support a center portion of said frame assembly when said frame assembly is in said flat configuration.

19. The convertible furniture system of claim 18, wherein said bench support comprises a pair of bench end support brackets disposed on respective ones of the opposing upright walls and configured to receive an engagement element disposed at a distal portion of said second frame portion, and a pair of extendable bench support legs coupled to the distal portion of said second frame portion.

20. The convertible furniture system of claim 18, wherein said bed support comprises a pair of end support brackets disposed on respective ones of the opposing upright walls and configured to receive an engagement element disposed at a distal portion of said second frame portion, and a pair of extendable bed support legs coupled to the distal portion of said second frame portion.

\* \* \* \* \*

UNITED STATES PATENT AND TRADEMARK OFFICE
CERTIFICATE OF CORRECTION

PATENT NO. : 11,419,427 B2
APPLICATION NO. : 17/114776
DATED : August 23, 2022
INVENTOR(S) : Cal G. Niemela, Terry L. Lahti and Marcus Niemela It is certified that error appears in the above-identified patent and that said Letters Patent is hereby corrected as shown below:

In the Claims

Column 11
Line 31, Claim 7, delete "front" after --the--

Column 12
Line 34, Claim 13, delete "inside the living space" after --system--

Signed and Sealed this
Fourth Day of July, 2023

Katherine Kelly Vidal
*Director of the United States Patent and Trademark Office*